United States Patent Office 3,836,543
Patented Sept. 17, 1974

3,836,543
METHOD OF PREPARING DIBENZO[d,g][1,3] DIOXOCIN ACIDS AND SALTS THEREOF
Johann Martin Grisar, Cincinnati, Ohio, assignor to Richardson Merrell Inc., New York, N.Y.
No Drawing. Filed Oct. 14, 1970, Ser. No. 80,767
Int. Cl. C07d 21/00
U.S. Cl. 260—340.3
4 Claims

ABSTRACT OF THE DISCLOSURE

An improved method for the production of dibenzo-[d,g][1,3]dioxocin-6-carboxylic acids comprises reacting an alkali salt of a 2,2'-methylenebisphenol with at least two equivalents of dichloroacetate salt in the presence of a solvent. Preferably one equivalent of alkali dichloroacetate reactant is employed at the start of the reaction and one or more additional equivalents of said reactant is added from 24 to 48 hours from the start of the reaction.

FIELD OF INVENTION

This invention relates to a new and improved method for the production of chemical compounds having utility as agents useful to reduce blood lipids, particularly lipoproteins containing cholesterol and triglycerides in warm-blooded animals when administered orally.

DISSCUSION OF PRIOR ART

Dibenzo[d,g][1,3]dioxocin-6-carboxylic acids of the formula

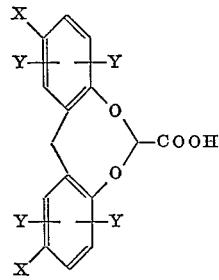

wherein X and Y are hydrogen or a halogen; and pharmaceutically acceptable salts of the above acid with organic and inorganic bases, or the corresponding lower alkyl esters, having blood lipid reducing activity, have heretofore only been prepared in low yields, generally from about 5 to 15% of theory. It has now been found that these compounds can be prepared in high yields.

SUMMARY OF INVENTION

According to the process of this invention the dibenzo-[d,g][1,3]dioxocin acids and salts are prepared by reacting an alkali salt of a 2,2'-methylenebisphenol, for example, 2,2'-methylenebis - (4 - chlorophenol), with at least two equivalents of dichloroacetate salt in a solvent such as a saturated aliphatic hydrocarbon alcohol having from 2 to 4 carbon atoms, water or dimethylformamide. Although the two or more equivalents of the alkali dichloroacetate reactant can all be added at the start of the reaction, a preferred embodiment of the invention is where one equivalent of the alkali dichloroacetate reactant is placed in the reaction mixture initially and then at a period of from about 24 to 48 hours from the start of the reaction one or more equivalents of the alkali dichloroacetate is added to the reaction mixture. When the compound is prepared according to the process of this invention, product yields of from 60 to 90 percent or higher are obtained, generally 85 percent or higher.

DETAILED DISCLOSURE OF INVENTION

The salts of the bisphenol and dihaloacetic acid are prepared in situ by addition of base. A variety of bases can be used such as, for example, potassium carbonate, sodium metal, sodium hydride, or potassium amide. Most of these form alkali alcoholates by reaction with the alcoholic solvent prior to interaction with the reactants. The preferred base is potassium carbonate. Sufficient base must be added to neutralize all phenolic and carboxylic acid functions. When potassium carbonate is used, addition of a two-fold excess is preferred.

The reaction temperature is equivalent to the boiling point of the solvent and vigorous stirring is required. The reaction time will vary from about 2 to 6 days, generally about 4 days. Catalytic amounts of potassium iodide may be added to the reaction mixture if desired.

As examples of suitable solvent there may be mentioned, for example, ethanol, n-propanol, isopropanol, n-butanol, and tert-butanol, as well as water and dimethylformamide.

The corresponding lower alkyl esters may be prepared by esterification of the dibenzo[d,g][1,3]dioxocin acids with lower aliphatic alcohols by generally known procedures.

The dibenzo[d,g][1,3]dioxocin acids, salts and esters hereof reduce blood lipids, particularly lipoproteins containing cholesterol and triglycerides, in warm-blooded animals and are useful in the treatment of hyperlipidemic states such as are encountered in patients with cardiovascular diseases, especially atherosclerotic diseases that can result in coronary heart disease and stroke. Cardiovascular diseases have been the leading cause of death in the United States in recent years. Mortality statistics show that of the various cardiovascular diseases, atherosclerotic processes occurring in the coronary or cerebral vessels are responsible for a large majority of deaths. A strong correlation exists between elevated plasma cholesterol and triglyceride levels and the development of atherosclerotic disease. Accordingly, it is considered desirable to reduce plasma cholesterol and triglyceride levels toward normal in treating diseases characterized by elevated blood lipid levels, e.g., coronary heart disease and stroke.

EXAMPLES

The following examples, in which the parts and percentages are parts and percent by weight unless otherwise specified, are illustrative of the process of this invention.

Example 1.—Preparation of 2,10-dichloro-12H-dibenzo[d,g][1,3]dioxocin-6-carboxylic acid To a mixture of 100 g. (0.372 mole) of 2,2'-methylenebis(4-chlorophenol) and 206 g. (1.488 mole) of potassium carbonate in 1500 ml. of dry isopropyl alcohol was added 48 g. (0.372 mole) of dichloroacetic acid. The mixture was refluxed with vigorous stirring for 30 hours then cooled for ½ hour, after which an additional 48 g. (0.372 mole) of dichloroacetic acid was added. The resulting reaction mixture was refluxed with vigorous stirring for 64 hours. The isopropyl alcohol was distilled off at atmospheric pressure and gradually replaced with water until the reaction temperature reached 100° C. After the addition of 100 ml. of an aqueous 10% solution of potassium hydroxide, the mixture was refluxed one hour and cooled overnight. The resulting precipitate was filtered off, slurried in 1000 ml. of an aqueous 2% solution of potassium hydroxide and filtered. The wet precipitate was combined with 1500 ml. of water to which 10% aqueous HCl was added until strongly acidic and stirred at room temperature for 2 hours to give the desired product, which was filtered off, washed with water and dried to give 103.0 g. Yield 85%; M.P. 226–235° C. (dec.).

Example 2.—Preparation of 2,10-dichloro-12H-dibenzo [d,g][1,3]dioxocin-6-carboxylic acid To a mixture of 100 g. (0.372 mole) of 2,2-methylene-bis-(4-chlorophenol) and 206 g. (1.488 mole) of potassium carbonate in 1500 ml. of dry isopropyl alcohol was added 96 g. (0.744 mole) of dichloroacetic acid. The mixture was refluxed with vigorous stirring for 94 hours. The isopropyl alcohol was distilled off at atmospheric pressure and gradually replaced with water until the reaction temperature reached 100° C. After the addition of 100 ml. of an aqueous 10% solution of potassium hydroxide, the mixture was refluxed one hour and cooled overnight. The resulting precipitate was filtered off, slurried in 1000 ml. of an aqueous 2% solution of potassium hydroxide and filtered. The wet precipitate was combined with 1500 ml. of water to which 10% aqueous HCl was added until strongly acidic and stirred at room temperature for 2 hours to give the desired product, which was filtered off and washed with water and dried to give 75.0 g. Yield 62%; M.P. 242–248° C. (dec.).

Example 3.—Comparative preparation of 2,10-dichloro-12H-dibenzo[d,g][1,3]dioxocin-6-carboxylic acid To a solution of 41.4 g. (0.30 mole) of anhydrous potassium carbonate in 200 ml. of water were added 27.0 g. (0.10 mole) of 2,2'-methylenebis-(4-chlorophenol) and 13.0 g. (0.10 mole) of dichloroacetic acid. The reaction mixture was refluxed for 15 hours. The solution was cooled in an ice bath and the resulting precipitate was filtered and air dried. The solid was slurried with 100 ml. of water and 10 ml. of concentrated HCl was added with stirring. After standing overnight the precipitate was filtered, washed with water, dried, recrystallized from ethyl acetate and dried in vacuo to give 4.5 g. of the desired product. Yield 13.8%; M.P. 242–246° C. (dec.).

Example 4.—Preparation of 2,4,8,10-tetrachloro-12H-dibenzo[d,g][1,3]dioxocin-6-carboxylic acid To a stirred mixture of 31.7 g. (0.094 mole) 2,2'-methylenebis-(4,6-dichlorophenol), 52.0 g. (0.376 mole) of potassium carbonate, 5.0 g. (0.030 mole) of potassium iodide and 500.0 ml. of n-propanol was added at room temperature, 12.1 g. (0.094 mole) of dichloroacetic acid. The reaction mixture was refluxed with vigorous stirring for 24 hours after which an additional 12.1 g. (0.094 mole) of dichloroacetic acid was added. This mixture was refluxed with stirring for 72 hours. The n-propanol was allowed to distill off with gradual replacement with water. The aqueous mixture was allowed to reflux an additional 2 hours and cooled. The precipitate was collected and washed with 2% aqueous potassium hydroxide. The precipitate was then suspended in 100 ml. water and 10% aqueous HCl added until the mixture was strongly acidic. The precipitate was collected, washed well with water and dried in a vacuum oven to give 30.3 g. of a white solid (M.P. 246–250° C.; yield 82%) which was recrystallized from toluene-acetone to give the desired product. M.P. 258–260° C. (dec.).

Example 5.—Preparation of methyl-2,4,8,10-tetrachloro-12H-dibenzo[d,g][1,3]dioxocin-6-carboxylate A mixture of 21.0 g. (0.053 mole) of 2,4,8,10-tetrachloro-12H-dibenzo[d,g][1,3]dioxocin - 6 - carboxylate, M.P. 246–250° C. (dec.), 500 ml. of methanol and 5.0 ml. of concentrated sulfuric acid was refluxed for one hour then allowed to cool. The crystalline product was separated and recrystallized from a 1:1 mixture of methanol-acetone to give 15.7 g. of the desired compound. Yield 72%; M.P. 184–186° C.

It is certainly unexpected that the use of two or more equivalents of dichloroacetic acid would improve the synthesis of the compound. Illustratively, the reaction of dichloroacetic acid with 2,2'-methylenebis-(4-chlorophenol) yields the compound of the invention via an intermediate as shown in the reaction below:

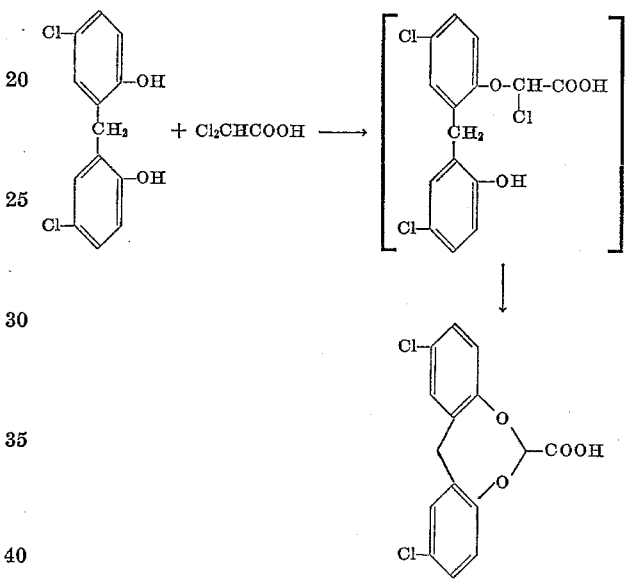

It is readily apparent that the intermediate can react with another mole of dichloroacetic acid or alternatively with another mole of the bisphenol, in either case, resulting in products different from the desired product. Therefore, previously one used equimolar amounts of reactants and avoided the use of an excess of either. It has been found, however, that the use of excess alkali dichloroacetate in accordance with this invention unexpectedly results in greatly improved yields of product.

Example 6.—Hypolipidemic activity of 2,10-dichloro-12H-dibenzo[d,g][1,3]dioxocin - 6-carboxylic acid in young rats Young male rats of the Wistar strain weighing initially about 170 grams were given free access to a diet to which the indicated amount of test compound was added. This diet was prepared by pouring an ethanolic solution of the compound over commercial Purina Lab Chow and mixing thoroughly allowing the solvent to evaporate. Groups of animals were given these diets for a period of 11 days. A control group was given the same diet with no added drug. At the end of the treatment period, all rats were bled by cardiac puncture and the plasma was analyzed for cholesterol and triglyceride content on a Technicon AutoAnalyzer. The results are given in Table I.

TABLE I

| Administered, percent in diet | Consumed, mg./kg.[a] | Plasma cholesterol | | Plasma triglyceride | |
|---|---|---|---|---|---|
| | | Mg./100 ml.[b] | Percent reduction | Mg./100 ml. | Percent reduction |
| 0.005 | 4.8 | 60.1±3.0 | 7.7 | 37.1±4.3 | 62.3 |
| 0.025 | 26.5 | 53.5±2.3 | 17.8 | 34.5±6.5 | 65.0 |
| 0.10 | 89.0 | 45.9±2.6 | 29.5 | 15.6±2.1 | 84.1 |
| 0 | 0 | 65.1±2.4 | | 98.5±6.5 | |

[a] Determined by measuring food consumption.
[b] Average ± standard error of the mean.

Other compounds having the structural formula indicated at the beginning of the specification also have hypolipidemic activity. It appears that useful clinical doses of the drugs may range from about 10 mg. to 4 g. per day for an adult person with the preferred dosage range of 50 mg. to 1 g. per day. The preferred dosage is by oral administration, although parental routes of administration are not precluded.

What is claimed is:

1. A method for the preparation of compounds of the formula

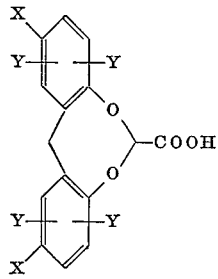

wherein X and Y are hydrogen or a halogen which comprises the step of reacting one equivalent of an alkali salt of a 2,2'-methylenebisphenol with two or more equivalents of a dihaloacetic acid or alkali salt thereof in the presence of a solvent selected from a saturated aliphatic hydrocarbon alcohol having from 2 to 4 carbon atoms, water and dimethylformamide.

2. The method of Claim 1 wherein one equivalent of the dichloroacetic acid reactant is employed at the start of the reaction and one or more additional equivalents of said reactant is added to the reaction mixture at a period of from about 24 to 48 hours from the start of the reaction.

3. The method of Claim 1 wherein the solvent is isopropanol.

4. The method of Claim 1 wherein the reactants are *in situ* formed salts of a 2,2'-methylenebisphenol and a dihaloacetic acid.

References Cited
UNITED STATES PATENTS

| | | | |
|---|---|---|---|
| 2,719,852 | 10/1955 | Retter | 260—340.3 |
| 3,553,234 | 1/1971 | Johnson et al. | 260—340.3 |

DONALD G. DAUS, Primary Examiner

J. H. TURNIPSEED, Assistant Examiner

U.S. Cl. X.R.

424—278